(12) United States Patent
Sekine

(10) Patent No.: US 11,373,638 B2
(45) Date of Patent: Jun. 28, 2022

(54) PRESENTATION ASSISTANCE DEVICE FOR CALLING ATTENTION TO WORDS THAT ARE FORBIDDEN TO SPEAK

(71) Applicant: Interactive Solutions Corp., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 17/281,257

(22) PCT Filed: Jan. 6, 2020

(86) PCT No.: PCT/JP2020/000073
§ 371 (c)(1),
(2) Date: Mar. 30, 2021

(87) PCT Pub. No.: WO2020/153109
PCT Pub. Date: Jul. 30, 2020

(65) Prior Publication Data
US 2021/0398523 A1    Dec. 23, 2021

(30) Foreign Application Priority Data

Jan. 22, 2019    (JP) .............................. JP2019-008121

(51) Int. Cl.
*G10L 15/08*    (2006.01)
*G06F 16/432*    (2019.01)
(Continued)

(52) U.S. Cl.
CPC .......... *G10L 15/083* (2013.01); *G06F 16/433* (2019.01); *G06F 16/48* (2019.01); *G10L 15/10* (2013.01); *G10L 2015/088* (2013.01)

(58) Field of Classification Search
CPC . G10L 15/083; G10L 15/10; G10L 2015/088; G06F 16/433; G06F 16/48
(Continued)

(56) References Cited

U.S. PATENT DOCUMENTS 7,730,113 B1 *   6/2010   Payette ................... G06Q 10/00
                                                            709/224
7,966,187 B1 *   6/2011   Pettay ..................... G10L 15/26
                                                            704/270.1
(Continued)

FOREIGN PATENT DOCUMENTS

CN    101794576 A    8/2010
CN    102006176 A    4/2011
(Continued)

OTHER PUBLICATIONS

International Search Report of international Patent Application No. PCT/JP2020/000073 completed Mar. 4, 2020 and dated Mar. 17, 2020 (5 pages).
(Continued)

*Primary Examiner* — Thuykhanh Le
(74) *Attorney, Agent, or Firm* — Pyprus Pte Ltd; George D. Liu

(57) ABSTRACT

To provide a presentation assistance device that can display keywords related to presentation materials and call attention by displaying an alert when words that are forbidden to speak are spoken. A presentation assistance device 1 comprises: a presentation material storage means 3; a keyword storage means 5 which stores a plurality of keywords related to presentation materials; a related word storage means 7 which stores one or a plurality of related words for each of the plurality of keywords; an NG word storage means 9 which stores one or a plurality of NG words for each of the plurality of keywords; a voice recognition means 11; a term determination means 15 which determines whether a voice
(Continued)

recognition term corresponds to a related word or an NG word; and a keyword output means 17 which when the voice recognition is a related word, outputs a keyword related to the related word, and when the voice recognition term is an NG word, outputs an alert and a keyword related to the NG word.

4 Claims, 6 Drawing Sheets

(51) Int. Cl.
  *G06F 16/48* (2019.01)
  *G10L 15/10* (2006.01)
(58) Field of Classification Search
  USPC .......................................................... 704/251
  See application file for complete search history.

(56) References Cited

U.S. PATENT DOCUMENTS

| | | | | |
|---|---|---|---|---|
| 8,176,055 | B1* | 5/2012 | Datar | G06Q 30/02 707/754 |
| 9,225,833 | B1* | 12/2015 | Koster | H04M 3/42221 |
| 9,563,874 | B1* | 2/2017 | McPhie | G06Q 10/10 |
| 2002/0073150 | A1* | 6/2002 | Wilcock | H04L 67/38 709/227 |
| 2003/0227479 | A1* | 12/2003 | Mizrahi | G09B 7/00 715/753 |
| 2007/0048715 | A1* | 3/2007 | Miyamoto | G10L 15/26 704/E15.045 |
| 2008/0134282 | A1* | 6/2008 | Fridman | G06Q 10/10 726/1 |
| 2008/0184284 | A1* | 7/2008 | O'Hern | H04N 21/4394 348/E5.002 |
| 2009/0288112 | A1* | 11/2009 | Kandekar | H04N 21/4532 725/32 |
| 2009/0288131 | A1* | 11/2009 | Kandekar | G06F 16/48 455/414.1 |
| 2011/0055227 | A1* | 3/2011 | Igarashi | H04N 7/15 707/750 |
| 2011/0113349 | A1* | 5/2011 | Kiciman | H04L 51/32 715/753 |
| 2011/0282727 | A1* | 11/2011 | Phan | G06Q 30/0241 705/14.1 |
| 2012/0201362 | A1* | 8/2012 | Crossan | G10L 15/26 704/226 |
| 2013/0297706 | A1* | 11/2013 | Arme | H04N 21/8455 709/206 |
| 2014/0058725 | A1* | 2/2014 | Longe | G06F 3/02 704/9 |
| 2014/0229156 | A1* | 8/2014 | Leydon | H04L 51/046 704/2 |
| 2014/0288917 | A1* | 9/2014 | Orsini | G06Q 30/0201 704/2 |
| 2014/0288918 | A1* | 9/2014 | Orsini | G06F 40/58 704/2 |
| 2014/0297740 | A1* | 10/2014 | Narayanan | H04L 67/306 709/204 |
| 2014/0303960 | A1* | 10/2014 | Orsini | G06Q 30/0217 704/2 |
| 2014/0303961 | A1* | 10/2014 | Leydon | G06F 40/51 704/2 |
| 2015/0070516 | A1* | 3/2015 | Shoemake | H04N 21/4542 348/207.11 |
| 2015/0072651 | A1* | 3/2015 | Ruttenbur | H04L 67/02 455/411 |
| 2015/0117662 | A1* | 4/2015 | Kulavik | G10L 25/51 381/74 |
| 2015/0221299 | A1* | 8/2015 | Matula | H04M 3/5175 704/249 |
| 2016/0328482 | A1* | 11/2016 | Shah | G06Q 50/01 |
| 2016/0337364 | A1* | 11/2016 | Grankovskyi | G06F 40/279 |
| 2017/0064076 | A1* | 3/2017 | Hayakawa | G10L 25/51 |
| 2017/0344515 | A1* | 11/2017 | Gevka | G06F 40/143 |
| 2018/0325470 | A1* | 11/2018 | Fountaine | H04N 21/2187 |
| 2019/0364126 | A1* | 11/2019 | Todd | H04L 67/20 |
| 2019/0371300 | A1* | 12/2019 | Park | G10L 15/01 |
| 2020/0106813 | A1* | 4/2020 | Vendrow | H04L 65/4015 |

FOREIGN PATENT DOCUMENTS

| | | | |
|---|---|---|---|
| CN | 108763499 A | 11/2018 | |
| JP | 2002-259635 A | 9/2002 | |
| JP | WO2008069187 A1 | 6/2008 | |
| JP | WO2009020092 A1 | 2/2009 | |
| JP | 2011-22886 A | 2/2011 | |
| JP | 2011-160626 * | 7/2011 | ............ G10L 15/00 |
| JP | 2013-25608 A | 2/2013 | |
| JP | 2013-25609 A | 2/2013 | |
| JP | 2014-123813 A | 7/2014 | |
| JP | 2015-61116 A | 3/2015 | |
| JP | 2017-224052 A | 12/2017 | |

OTHER PUBLICATIONS

Written Opinion of International Patent Application No. PCT/JP2020/000073 completed Mar. 4, 2020 and dated Mar. 17, 2020 (5 pages).
Office Action of Chinese patent application No. 202080005536.6 dated Oct. 11, 2021 (8 pages).

* cited by examiner

FIG.7

PRESENTATION ASSISTANCE DEVICE FOR CALLING ATTENTION TO WORDS THAT ARE FORBIDDEN TO SPEAK

TECHNICAL FIELD

The present invention relates to a presentation assistance device with which attention can be called by outputting an alert when a presenter speaks a word that is forbidden to speak.

BACKGROUND ART

JP2002-259635A discloses a system that displays, using a combination of a graphic object and text, a keyword from utterances spoken by discussion participants during the course of a discussion.

JP2017-224052A discloses a presentation evaluation device.

PRIOR ART DOCUMENTS

Patent Documents

Patent Document 1: JP2002-259635A
Patent Document 2: JP2017-224052A

SUMMARY OF INVENTION

Technical Problem

When making a presentation, it is desirable to display keywords in order to provide a smooth explanation. On the other hand, there are times when a speaker may inadvertently speak a forbidden word which must not be spoken in relation to a presentation material. In such a case, a system which encourages a speaker to correct his or her speech on the spot would be desirable.

Thus, an object of an invention according to an embodiment described in this specification is to provide a presentation assistance device which displays keywords related to presentation materials, and with which attention can be called by displaying an alert when a word that is forbidden to speak has been spoken.

Solution to Problem

An invention related to one aspect of the present specification is based on the finding that storing, in relation to a presentation material, keywords as well as related words and NG words (no-good words) which are related to the keywords, determining by speech recognition whether a related word or an NG word has been spoken, and displaying a keyword when a related word has been spoken and outputting a predetermined alert when an NG word has been spoken enables a presentation to be given smoothly while also enabling guidance so that an improper statement can be retracted if such an improper statement is made.

One embodiment described in the present specification relates to a presentation assistance device 1.

This device includes a presentation material storage means 3, a keyword storage means 5, a related word storage means 7, an NG word storage means 9, a speech recognition means 11, a term determination means 15, and a keyword output means 17.

The device is, for example, implemented by a computer. Each of the above-mentioned means is, for example, implemented by a computer.

The presentation material storage means 3 is an element for storing a presentation material.

The keyword storage means 5 is an element for storing a plurality of keywords related to the presentation material.

The related word storage means 7 is a means for storing one or a plurality of related words for each of the plurality of keywords stored by the keyword storage means.

The NG word storage means 9 is a means for storing one or a plurality of NG words for each of the plurality of keywords stored by the keyword storage means.

The speech recognition means 11 is a means for recognizing a conversation of a conversant as speech.

The term determination means 15 is a means for determining whether a speech recognition term, which is a term included in the speech recognized by the speech recognition means, corresponds to a related word or an NG word.

The keyword output means 17 is a means for outputting a keyword related to the related word when the speech recognition term is a related word, and for outputting a keyword and an alert related to the NG word when the speech recognition term is an NG word.

An embodiment of the presentation assistance device further includes a keyword creation/update means 19 that creates or updates, using terms related to the presentation material which have been recognized by the speech recognition means 11, a plurality of keywords related to the presentation material which are stored by the keyword storage means 5.

An embodiment of the presentation assistance device further includes an evaluation point storage means 21 and a conversation evaluation means 23.

The evaluation point storage means 21 is an element for storing an evaluation point related to one or two or more of the keywords, related words, and NG words.

The conversation evaluation means 23 is a means for evaluating a conversation recognized by the speech recognition means as speech by reading the evaluation point stored by the evaluation point storage means 21 for the keywords, related words, and NG words determined by the term determination means 15.

One embodiment described in the present specification relates to program. This program is for causing a computer to function as the presentation material storage means 3, the keyword storage means 5, the related word storage means 7, the NG word storage means 9, the speech recognition means 11, the term determination means 15, and the keyword output means 17.

One embodiment described in the present specification relates to a computer-readable information recording medium in which the above-mentioned program is stored.

Effects of Invention

An invention of an embodiment described in this specification is capable of displaying keywords related to presentation materials, and calling attention by displaying an alert when a word that is forbidden to speak has been spoken.

BRIEF DESCRIPTION OF DRAWINGS

FIG. 7 is a schematic view illustrating an example in which NG words corresponding to a presentation material can be set.

DESCRIPTION OF EMBODIMENTS

In the following, embodiments for carrying out the present invention shall be described using drawings. The present invention is not limited to the embodiments described below, and may be appropriately modified from the embodiments below within a scope that would be obvious to a person skilled in the art.

One embodiment described in the present specification relates to a presentation assistance device 1. The presentation assistance device is implemented by a computer. When a speaker gives a presentation using a certain presentation material stored in the computer, the presentation assistance device encourages appropriate explanation by displaying a keyword on a display device for the speaker, and reads an appropriate subsequent presentation material. Further, if the speaker has spoken an NG word (no-good word) which is a word that is forbidden to speak, the presentation assistance device outputs an alert to the display device for the speaker to call the speaker's attention. This system may also be implemented by a mobile terminal (a computer terminal such as a mobile telephone) of a presenter, and may be implemented by a computer and a server.

Figure 1:
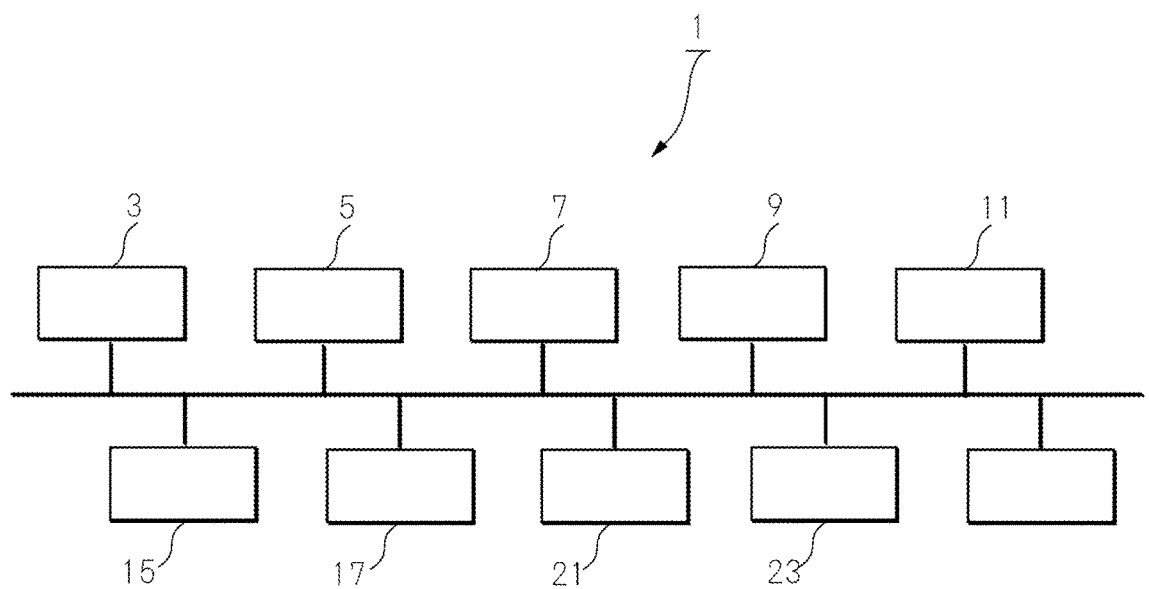
FIG. 1 is a schematic view illustrating a configurational example of a presentation assistance device.

FIG. 1 is a schematic view illustrating a configurational example of the presentation assistance device. The device 1 includes a presentation material storage means 3, a keyword storage means 5, a related word storage means 7, an NG word storage means 9, a speech recognition means 11, a term determination means 15, and a keyword output means 17. The device is, for example, implemented by a computer. Each of the above-mentioned means is, for example, implemented by a computer.

Figure 2:
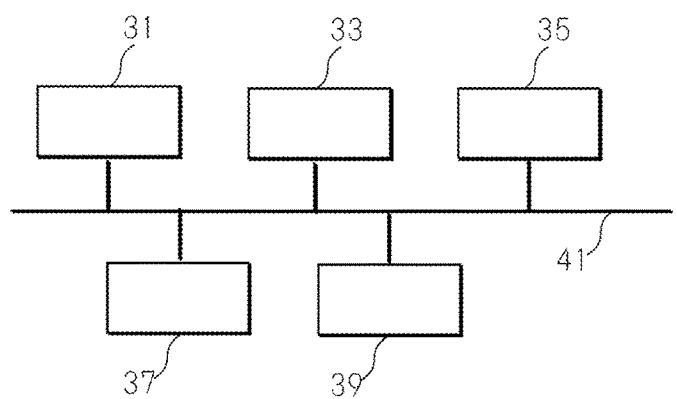
FIG. 2 is a block diagram illustrating a basic configuration of a computer.

FIG. 2 is a block diagram illustrating a basic configuration of a computer. As shown in FIG. 2, the computer includes an input unit 31, an output unit 33, a control unit 35, a calculation unit 37, and a storage unit 39. These elements are connected by a bus 41, etc. such that information can be transmitted and received therebetween. For example, in the storage unit, a control program may be stored, and various types of information may also be stored. If a prescribed piece of information is input from the input unit, the control unit reads the control program stored in the storage unit. The control unit then reads, as appropriate, the information stored in the storage unit and transmits the information to the calculation unit. The control unit subsequently transmits, as appropriate, the information that was input to the calculation unit. The calculation unit uses the various information that was received to perform a calculation process, and stores the calculation result in the storage unit. The control unit reads the calculation result stored in the storage unit, and outputs the calculation result from the output unit. In this way, various processes are executed. The elements which will be explained below may correspond to one of the elements of the computer.

Figure 3:
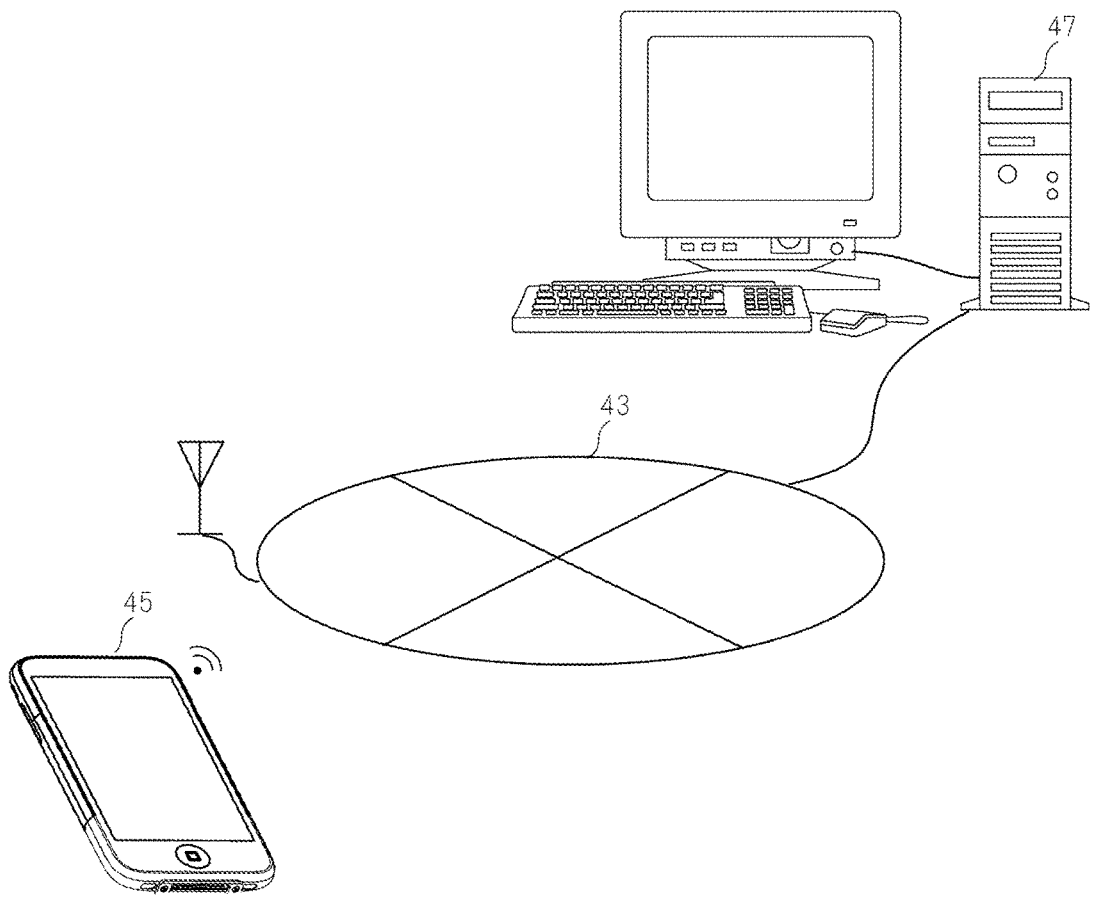
FIG. 3 is a schematic view illustrating an example of a system of the present invention.

FIG. 3 is a schematic view illustrating an example of a system of the present invention. As shown in FIG. 3, the system of the present invention (a system including the device of the present invention) may include a mobile terminal 45 connected to an internet or intranet 43, and a server 47 connected to the internet or intranet 43. Of course, a single computer or mobile terminal may function as the device of the present invention, and there may be multiple servers.

The presentation material storage means 3 is an element for storing presentation materials. For example, the storage unit of the computer may function as the presentation material storage means. An example of a presentation material is each page of a PowerPoint®. The presentation material is a material that is stored in the computer, and that is displayed on a display unit so that a presentation can be given to a conversation partner or an audience.

The keyword storage means 5 is an element for storing a plurality of keywords related to the presentation material. For example, the storage unit of the computer may function as the keyword storage means. An example of the plurality of keywords related to the presentation material is a term that is preferable to use when giving an explanation based on each page of a PowerPoint. The storage unit stores the plurality of keywords in relation to each page of the presentation material such as a PowerPoint.

The related word storage means 7 is a means for storing one or a plurality of related words for each of the plurality of keywords stored by the keyword storage means. For example, the storage unit of the computer may function as the related word storage means. A related word is a term used in relation to a keyword, which is a term that is preferable to use when explaining, when the keyword is spoken.

The NG word storage means 9 is a means for storing one or a plurality of NG words for each of the plurality of keywords stored by the keyword storage means. For example, the storage unit of the computer may function as the NG word storage means. An NG (no-good) word is, for example, a term that a speaker must not use in the explanation or a term that should be corrected if used in relation to a keyword, such as a word that is forbidden to speak. Examples of NG words include terms for stretching a pause such as "umm" or "well", terms of assertion such as "does not work", "absolutely", "100%", and "I guarantee", abusive words such as "idiot" and "can't", and discriminatory terms such as "unfair" and "blind".

The speech recognition means 11 is a means for recognizing a conversation of a conversant as speech. Speech information from a sound collection device such as a microphone is input into the computer via the input unit of the computer. The speech information that is input is, for example, temporarily stored in the storage unit. The speech recognition means 11 is, for example, an element for analyzing the speech information stored in the storage unit and recognizing the conversation of a conversant as speech. Speech recognition technology is publicly known. Therefore, the speech recognition means 11 can be implemented using a publicly-known program. The speech information recognized by the speech recognition means 11 is, for example, stored in the storage unit as a speech recognition term.

The term determination means 15 is a means for determining whether a speech recognition term, which is a term included in the speech recognized by the speech recognition means, corresponds to a related word or an NG word. The term determination means 15 may also determine whether a speech recognition term is a keyword. The term determination means 15 reads a speech recognition term stored in the storage unit. The speech recognition term may be in the form of a single word, or in the form of a phrase. Further, the term determination means 15 performs a search regarding whether the speech recognition term that was read matches a related word or an NG word (or a keyword) stored in the storage unit, and if there is a matching related word or NG word (or keyword), the term determination means 15 stores, in the storage unit, the related word or NG word (or keyword) together with the speech recognition term. In this way, it is determined whether the speech recognition term corresponds to a related word or an NG word.

The keyword output means 17 is a means for outputting a keyword related to the related word when the speech recognition term is a related word, and for outputting a keyword and an alert related to the NG word when the speech recognition term is an NG word. The alert may be, for example, a warning sound which can be heard by the presenter, or may be realized by displaying a term on the display unit that calls the attention of the presenter (such as the phrase "You have used a word that is forbidden to be used. Please be careful."). Further, the alert may be realized by displaying a symbol on the display unit that calls the attention of the presenter (such as the symbol "!" or "×"). A keyword related to an NG word may be, for example, a term to be used when revising or correcting the NG word. By displaying such a keyword, the presenter can be encouraged to make an effective correction.

If the speech recognition term is a related word, the keyword output means 17 reads a keyword related to the related word from the related word storage means 7, outputs the keyword to the display unit, and displays the keyword on the display unit. A presentation-related keyword may also be stored in the storage unit in relation to a presentation material. Further, if a keyword related to a related word which is included in a conversation that takes place while a presentation material is being displayed on the display unit is a presentation-related keyword, the presentation-related keyword may be adopted as the keyword. By doing so, a keyword related to a presentation material can be appropriately extracted. Thereby, a keyword which a person giving an explanation should use in relation to a presentation can be displayed on the display unit for the person giving the explanation (for example, a display unit of a mobile telephone, or a display screen of a personal computer of the person giving the explanation). In addition, other presentation materials related to this keyword can be extracted as candidates for the next presentation material.

If the speech recognition term is an NG word, the keyword output means 17 reads, from the related word storage means 7, a keyword related to the NG word, outputs the keyword to the display unit, and displays the keyword on the display unit. A presentation-related keyword may also be stored in the storage unit in relation to a presentation material. If the keyword related to the NG word is a presentation-related keyword, the presentation-related keyword may be adopted as the keyword. By doing so, a keyword related to a presentation material can be appropriately extracted. Further, a presentation-related NG word, which is an NG word related to a presentation material, may also be stored in the storage unit. If an NG word which is included in a conversation that takes place while a presentation material is being displayed on the display unit is a presentation-related NG word, the presentation-related NG word may be adopted as the NG word.

Thereby, a keyword which a person giving an explanation should use in relation to a presentation can be displayed on the display unit for the person giving the explanation (for example, a display unit of a mobile telephone, or a display screen of a personal computer of the person giving the explanation). In addition, other presentation materials related to this keyword can be extracted as candidates for the next presentation material.

An embodiment of the presentation assistance device may further include a keyword creation/update means 19 that creates or updates, using terms related to the presentation material which have been recognized by the speech recognition means 11, a plurality of keywords related to the presentation material which are stored by the keyword storage means 5. If the frequency of a term included in a conversation that takes place while a presentation material is being displayed on the display unit is high, this term may be regarded as a term which is used frequently during an explanation using the presentation material. In this case, a new keyword may be recognized using the term used while a presentation material is being displayed on the display unit as a related word, and the new keyword may be stored in the keyword storage means. For this frequency, for example, a predetermined number of times or a use frequency threshold relative to all terms is stored in the storage unit. If it is determined by the computer that a certain term has surpassed the threshold, this term should be newly added as a keyword related to the presentation material. Further, if the threshold is stored in the storage unit and the keyword is not used even though many presentations have been given, the keyword may be deleted from the keywords related to that presentation material. In this way, the keyword storage means can be automatically updated. In addition, even if the necessary explanations or necessary terms have changed with the times, the keyword information can be updated automatically without the need to manually update the keywords stored by the keyword storage means. Moreover, if the keywords related to a certain presentation material are updated, the related words and NG words are also automatically updated, and thus it is not necessary to change the related words and NG words for each presentation material.

In a preferred embodiment of the device, a display screen that displays a keyword related to each presentation material can be output, and if a user determines that the keyword is an NG word, this keyword can be stored in the storage unit as an NG word related to the presentation material. In this case, the NG word is read separately in relation to the presentation material, and then it is determined whether the speech recognition term is an NG word.

Further, even if a keyword is not stored in advance, one or more explanations given by a superior presenter based on a certain presentation material may be stored and then the terms therein may be analyzed, and thereby one or more keywords related to the presentation material can be automatically extracted and stored. For this keyword extraction, a statistical process using information related to the frequency or probability may be performed, and the keyword accuracy may be improved by machine learning. In addition, the keywords may be extracted from only conversations (presentations) in which no NG words were included.

An embodiment of the presentation assistance device further includes an evaluation point storage means 21 and a conversation evaluation means 23.

The evaluation point storage means 21 is an element for storing an evaluation point related to one or two or more of the keywords, related words, and NG words. For example, the storage unit functions as the evaluation point storage means 21.

The conversation evaluation means 23 is a means for evaluating a conversation recognized by the speech recognition means as speech by reading the evaluation point stored by the evaluation point storage means 21 for the keywords, related words, and NG words determined by the term determination means 15. Speech information recognized by the speech recognition means 11 is, for example, stored in the storage unit as a speech recognition term. The term determination means 15 performs a search regarding whether the speech recognition term that was read matches a related word or an NG word (or a keyword) stored in the storage unit, and if there is a matching related word or NG word (or keyword), the term determination means 15 stores, in the storage unit, the related word or NG word (or keyword) together with the speech recognition term. The conversation evaluation means 23 reads the keywords, related words, and NG words from the storage unit, and reads the evaluations points related to the keywords, related words, and NG words that were read from the storage unit. The conversation evaluation means 23 then, for example, reads the evaluation points related to the keywords, related words, and NG words included in a certain conversation or in an explanation related to a certain presentation material, and causes the calculation unit to add up the evaluation points. In this way, a conversation related to a certain presentation material can be evaluated. In the case of a presentation, the conversation may be one-sided. In such a case, the presentation ability of the person giving the explanation can be evaluated.

One embodiment described in the present specification relates to program. This program is for causing a computer to function as the presentation material storage means 3, the keyword storage means 5, the related word storage means 7, the NG word storage means 9, the speech recognition means 11, the term determination means 15, and the keyword output means 17. The program may be a program for implementing the system of the above-described embodiments. The program may take the form of an application that is installed on a mobile terminal.

One embodiment described in the present specification relates to a computer-readable information recording medium in which the above-mentioned program is stored. Examples of the information recording medium include a CD-ROM, a DVD, a floppy disk, a memory card, and a memory stick.

Figure 4:
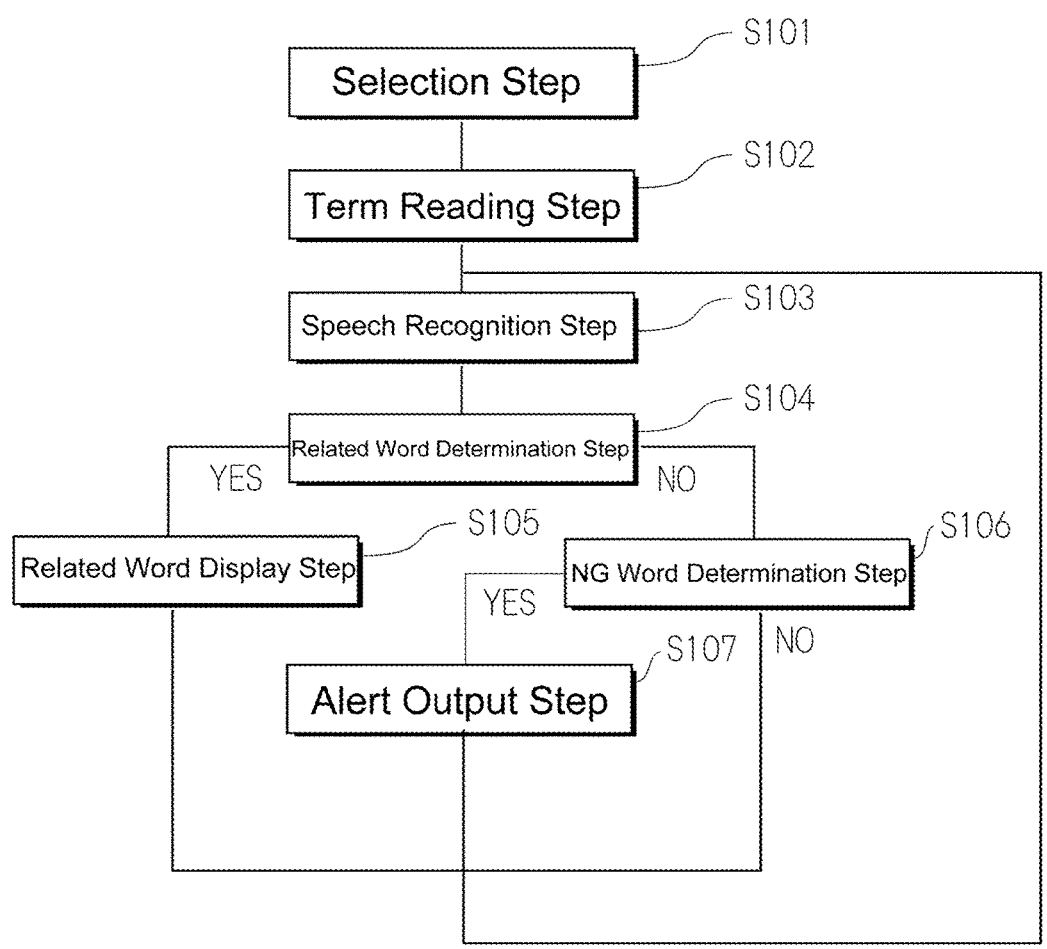
FIG. 4 is a flowchart for explaining an example of a presentation assistance method.

FIG. 4 is a flowchart for explaining an example of a presentation assistance method.

A presentation material, a plurality of keywords related to the presentation material, one or a plurality of related words for each of the plurality of keywords, and one or a plurality of NG words for each of the plurality of keywords are stored in advance in a computer.

Selection Step (S101)

A presenter selects a presentation material using the computer. Upon doing so, the computer receives information that the presentation material was selected. The computer then reads the presentation material from the storage unit, and displays the presentation material on the display unit (S101). The display unit may be a display unit of the computer, or may be a screen, etc. For example, if there has been an input to proceed to the next page of a PowerPoint®, it may be determined that a presentation material related to the next page has been selected. Further, as will be discussed below, since related words or keywords are displayed on the presentation material, if the presenter selects a related word or keyword that is displayed, a presentation material related to the selected related word may be selected and displayed.

Term Reading Step (S102)

The computer reads a keyword that is stored in relation to the presentation material. The computer then reads, from the storage unit, terms including related words and NG words that are stored in the storage unit in relation to the keyword that was read (S102). Therein, the related words and NG words may be stored temporarily in the storage unit for the process explained below. A certain keyword may be stored in relation to multiple presentation materials. By doing so, the same related words and NG words will be read via this keyword even when a different presentation material has been selected.

Speech Recognition Step (S103)

Once the presentation has begun, the conversation of a conversant is input into the computer using a microphone or the like, and the computer recognizes the conversation (presentation) as speech (S103). The recognized speech may be stored in the storage unit as appropriate. Further, the speech recognized by the computer may be subjected to term conversion and then stored in the storage unit as a speech recognition term.

Related Word Determination Step (S104)

The computer determines whether the speech recognition term, which is a term included in the speech recognized by the speech recognition means, is a related word. Since the computer is reading, from the storage unit, the related words related to the presentation material (and may temporarily store the related words as appropriate), the calculation unit should be made to perform the determination regarding whether the speech recognition term matches a related word related to the presentation material.

Related Word Display Step (S105)

If it was determined in step 104 that the speech recognition term is a related word, the computer reads a keyword related to the related word from the storage unit, and displays the keyword on the display unit. The keyword may be the related word itself. At this time, if the conversant and the audience are each looking at separate display units (for example, if there is a computer that the conversant is using and the conversant can look at the monitor thereof, and the audience can look at a computer terminal, display unit, or screen for the audience), the related word may be displayed on only the display unit for the conversant. This kind of process is achieved by outputting a command to display the related word or keyword to only the computer of the conversant. By doing so, the related word and its keyword are displayed only to the conversant, and they can serve as a hint for the presentation, and also contribute to selecting the next presentation material.

Figure 5:
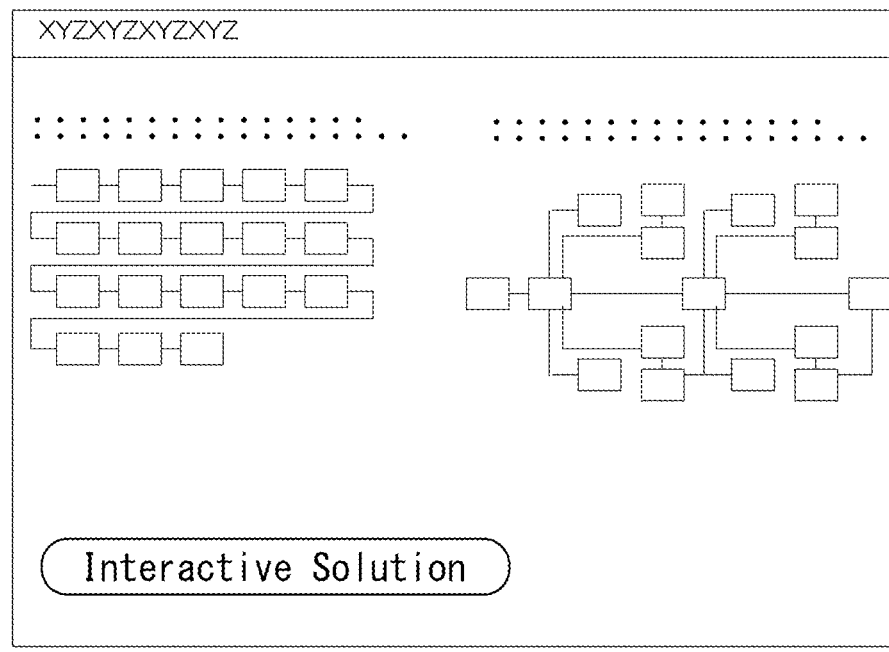
FIG. 5 is a schematic view illustrating an example in which a keyword related to a related word is displayed in a presentation material.

FIG. 5 is a schematic view illustrating an example in which a keyword related to a related word is displayed on a presentation material. In this example, a keyword related to a related word is displayed on the display unit for the presenter (conversant). In this example, the terms "interactive" and "solution" are displayed. The presenter can use these terms in his or her explanation, and if the presenter touches these terms on the screen or indicates them with a pointer, a presentation material related to "interactive" or "solution" is read in relation to the current presentation material. The same process as that above may also be carried out on this new presentation material.

NG Word Determination Step (S106)

If it was determined in step 104 that the speech recognition term is not a related word, the computer determines whether the speech recognition term corresponds to an NG word. Since the computer is reading, from the storage unit, the NG words related to the presentation material (and may temporarily store the NG words as appropriate), the calculation unit should be made to perform the determination regarding whether the speech recognition term matches an NG word related to the presentation material.

Alert Output (S107)

If the speech recognition term is an NG word (YES in step 106), the computer reads, from the storage unit, a keyword and an alert related to the NG word, and outputs the keyword and the alert. An example of the alert is an output with which the attention of the presenter can be called, such as displaying in red the keyword that is displayed on the display unit, or displaying "NG WORD!" on the display unit. Another example of the alert is a warning sound output by voice to a headset of the presenter. The keyword related to the NG word should be displayed on the display unit.

Figure 6:
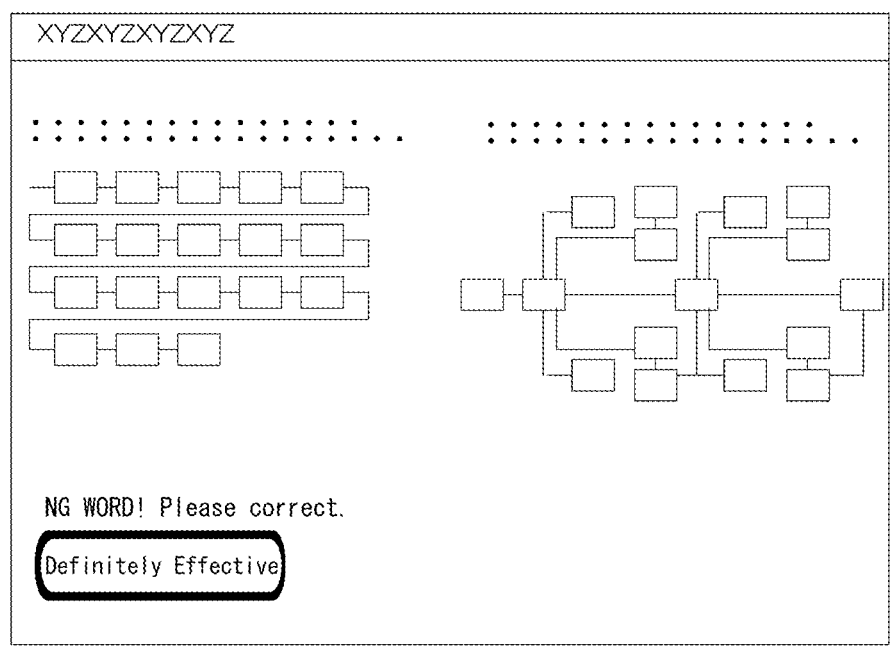
FIG. 6 is a schematic view illustrating an example in which a keyword and an alert related to an NG word have been output.

FIG. 6 is a schematic view illustrating an example in which a keyword and an alert related to an NG word have been output. In this example, the presenter has stated that a certain pharmaceutical drug will "definitely have an effect". This is one of the related words related to the keyword "definitely effective". On the display unit, "definitely effective" is displayed, which is the keyword related to the related word "definitely have an effect" spoken by the presenter. Above that, a display encouraging a correction is displayed. In the display shown in FIG. 6, the keyword is emphasized compared to the display shown in FIG. 5, so as to call the attention of the presenter. Further, the determinations regarding a related word and an NG word may be carried out simultaneously, or the determination regarding an NG word may be carried out first and then followed by the determination regarding a related word. It may also be determined whether the speech recognition term is a keyword. By doing so, it can also be determined whether a keyword has been used in the presentation. In this way, the terms used in the presentation are evaluated.

Figure 7:
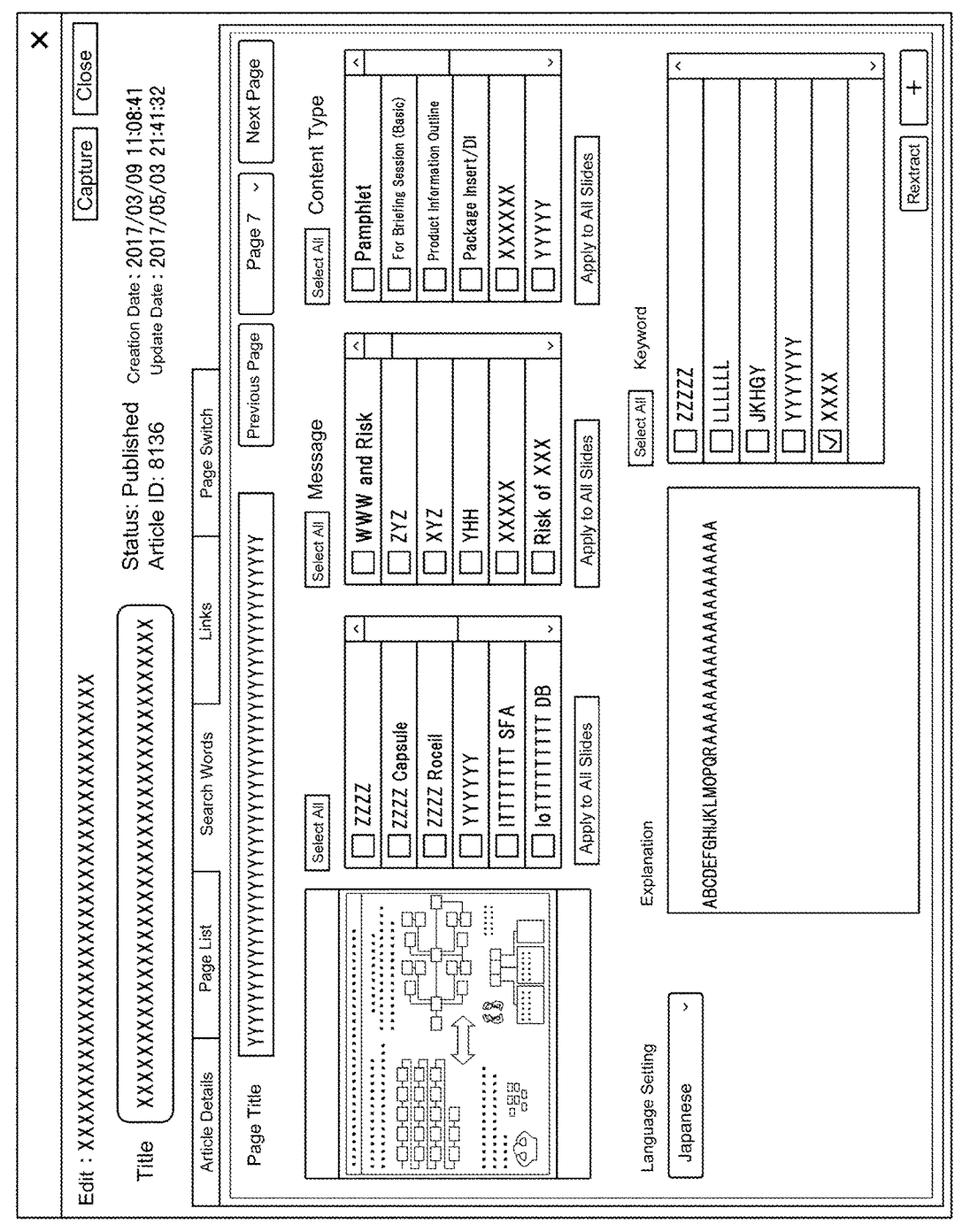

FIG. 7 is a schematic view illustrating an example in which NG words corresponding to a presentation material can be set. As shown in FIG. 7, in this example, a display screen displaying keywords related to each presentation material is output. If a user has determined that one of those keywords is an NG word, the user makes an input indicating that the keyword is an NG word related to the presentation material. This input may be made by, for example, clicking an icon related to the keyword or raising an NG word flag using a radio button. Upon doing so, the NG word is stored in relation to the presentation material in the storage unit. Further, if the presentation material is selected, the NG words related thereto are read separately, and then the determination regarding whether a speech recognition term is an NG word is made. In the example of FIG. 7, an NG word flag is raised for the keyword "XXXX". In this example, if the user clicks a radio button related to the keyword from a management screen, information indicating that the keyword has been selected is input to the computer, and the keyword is set as an NG word and stored in the storage unit.

INDUSTRIAL APPLICABILITY

The present invention relates to a presentation assistance device, and thus can be utilized in information-related industries.

REFERENCE SIGNS LIST

1: presentation assistance device
3: presentation material storage means
5: keyword storage means
7: related word storage means
9: NG word storage means
11: speech recognition means
15: term determination means
17: keyword output means

The invention claimed is:

1. A presentation assistance device (1) comprising:
a presentation material storage means (3) that stores a presentation material;
a keyword storage means (5) that stores a plurality of keywords related to the presentation material;
a related word storage means (7) that stores one or a plurality of related words for each of the plurality of keywords stored by the keyword storage means, wherein the related word storage means (7) does not store one or more keywords of the plurality of keywords stored by the keyword storage means (5);
an NG (No Good) word storage means (9) that stores one or a plurality of NG words for each of the plurality of keywords stored by the keyword storage means;
a speech recognition means (11) that recognizes a conversation of a conversant as speech;
a term determination means (15) that determines whether a speech recognition term, which is a term included in the speech recognized by the speech recognition means, is a related word stored in the related word storage means (7) or an NG word stored in the NG word storage means (9); and
a keyword output means (17) that outputs a keyword stored by the keyword storage means related to the related word when the speech recognition term is the related word, and that outputs a keyword stored by the keyword storage means and an alert related to the NG word when the speech recognition term is the NG word, wherein the keyword is a term that is preferably used by a person giving an explanation of the presentation material.

2. The presentation assistance device according to claim 1, further comprising
a keyword creation/update means (19) that creates or updates, using the speech recognition term, a plurality of keywords related to the presentation material which are stored by the keyword storage means (5).

3. The presentation assistance device according to claim 1, further comprising:
an evaluation point storage means (21) that stores an evaluation point related to one or two or more of the keywords, the related words, and the NG words; and
a conversation evaluation means (23) that reads the evaluation points stored by the evaluation point storage means (21) for the keywords, the related words, and the NG words determined by the term determination means (15), and adds up the evaluation points that were read to obtain a sum of the evaluation points.

4. A non-transitory tangible computer-readable information recording medium in which a program is stored where the program causes a computer to function as:
a presentation material storage means (3) that stores a presentation material;
a keyword storage means (5) that stores a plurality of keywords related to the presentation material;
a related word storage means (7) that stores one or a plurality of related words for each of the plurality of keywords stored by the keyword storage means, wherein the related word storage means (7) does not store one or more keywords of the plurality of keywords stored by the keyword storage means (5);

an NG (No Good) word storage means (9) that stores one or a plurality of NG words for each of the plurality of keywords stored by the keyword storage means; a speech recognition means (11) that recognizes a conversation of a conversant as speech;

a term determination means (15) that determines whether a speech recognition term, which is a term included in the speech recognized by the speech recognition means, is a related word stored in the related word storage means (7) or an NG word stored in the NG word storage means (9); and a keyword output means (17) that outputs a keyword stored by the keyword storage means related to the related word when the speech recognition term is the related word, and that outputs a keyword stored by the keyword storage means and an alert related to the NG word when the speech recognition term is the NG word, wherein the keyword is a term that is preferably used by a person giving an explanation of the presentation material.

* * * * *